(12) United States Patent
Zhou et al.

(10) Patent No.: US 12,028,946 B2
(45) Date of Patent: Jul. 2, 2024

(54) LED DRIVING ARRANGEMENT AND DRIVING METHOD

(71) Applicant: SIGNIFY HOLDING B.V., Eindhoven (NL)

(72) Inventors: Yufei Zhou, Shanghai (CN); Shan Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 17/913,543

(22) PCT Filed: Mar. 19, 2021

(86) PCT No.: PCT/EP2021/057060
§ 371 (c)(1),
(2) Date: Sep. 22, 2022

(87) PCT Pub. No.: WO2021/191067
PCT Pub. Date: Sep. 30, 2021

(65) Prior Publication Data
US 2023/0108118 A1    Apr. 6, 2023

(30) Foreign Application Priority Data

Mar. 24, 2020  (WO) ................ PCT/CN2020/080889
Jun. 11, 2020  (EP) .................................... 20179415

(51) Int. Cl.
*H05B 45/382*    (2020.01)
*H02M 3/156*    (2006.01)
*H05B 45/20*    (2020.01)

(52) U.S. Cl.
CPC .......... *H05B 45/382* (2020.01); *H02M 3/156* (2013.01); *H05B 45/20* (2020.01)

(58) Field of Classification Search
None
See application file for complete search history.

(56) References Cited

U.S. PATENT DOCUMENTS 9,538,601 B1     1/2017  Mangtani et al.
2011/0156612 A1  6/2011  Kanamori et al.
2012/0181940 A1  7/2012  Snelten et al.
(Continued)

FOREIGN PATENT DOCUMENTS

CN      102870498 A     1/2013

OTHER PUBLICATIONS

Z. Zhang, et al., "On Hiddenness of Moving Target Defense Against False Data Injection Attacks on Power Grid", ACM Transactions on Cyber-Physical Systems, vol. 4, Issue 3, pp. 1-29, Mar. 12, 2020.

*Primary Examiner* — Anh Q Tran

(57) ABSTRACT

A LED driving arrangement has a main converter stage and a power commutation stage in parallel with an LED unit. An energy divert mode of operation is used during which a set current is provided to the LED unit, and the main converter stage is used to deliver a current larger than the set current. The power commutation stage is used to divert energy from the LED unit and return the diverted energy to an input to the main converter. The remaining set current is delivered to the LED unit. This enables deeper dimming than the dimming level applied to the main converter stage, but without requiring an additional switch mode power converter.

15 Claims, 3 Drawing Sheets

(56) References Cited

U.S. PATENT DOCUMENTS

| | | | |
|---|---|---|---|
| 2012/0194078 A1* | 8/2012 | Ren | H05B 45/3725 |
| | | | 315/122 |
| 2017/0208660 A1 | 7/2017 | Hilgers et al. | |
| 2017/0231050 A1 | 8/2017 | Wang et al. | |
| 2017/0290117 A1* | 10/2017 | Linnartz | H05B 47/19 |
| 2018/0034270 A1 | 2/2018 | Jutras et al. | |
| 2018/0227993 A1 | 8/2018 | Zhang | |
| 2019/0222125 A1* | 7/2019 | Schaemann | H05B 45/327 |

\* cited by examiner

LED DRIVING ARRANGEMENT AND DRIVING METHOD

CROSS-REFERENCE TO PRIOR APPLICATIONS

This application is the U.S. National Phase application under 35 U.S.C. § 371 of International Application No. PCT/EP2021/057060, filed on Mar. 19, 2021, which claims the benefits of European Patent Application No. 20179415.3, filed on Jun. 11, 2020, and Chinese Patent Application No. PCT/CN2020/080889, filed on Mar. 24, 2020. These applications are hereby incorporated by reference herein.

FIELD OF THE INVENTION

This invention relates to LED driving arrangements. In particular it relates to LED driving arrangements which implement a dimming function.

BACKGROUND OF THE INVENTION

It is well known to provide LED driving arrangements with a dimming function, for example for smart lighting systems, both for indoor and outdoor applications. Smart lighting systems aim to deliver comfortable lighting with plentiful and rich colors, with the ability to create a wide range of desired colors or color temperatures.

The most important and most basic element to achieve this controllability is the ability to implement a deep dimming function (for different colors). Deep dimming is thus a key parameter to meet the desired optical performance of a smart lighting system. For example, there are large differences between the color and color temperature coverage which can be achieved as between a 5% dimming capability and a 0.1% dimming capability.

A traditional driver system typically allows dimming of brightness down to a lower limit, such as a 5% brightness level. So called "deep dimming" below this lower limit is difficult to achieve with existing driver architectures, in particular based on switch mode power converter circuits.

Improving the dimming capability to allow dimming below this limit, e.g. below 5% brightness such as down to 0.1% brightness, is a big challenge for traditional driver circuits, especially when in a low power output regime. The problem is that a single stage topology switch mode power supply system cannot reach less than 5% deep dimming because of the driver architecture, for example as a result of the dynamic characteristics or control loop limitations. Thus, it is the hardware design which makes the desired deep dimming difficult to achieve.

The traditional solution is to add one or more additional switch mode power topology structures. However, this adds complexity and cost to the overall architecture. There is therefore a need for a driving arrangement which allows a reduced current drive (and hence deep dimming) with reduced circuit complexity. Another traditional solution is adding a resistive bleeder in parallel with the LED, but that resistive bleeder is normally dissipating power and causes high loss.

U.S. Pat. No. 9,538,601B1 discloses a bypass switch 22 to bypass the current to the LED 12.

SUMMARY OF THE INVENTION

The invention is defined by the claims.

It is a concept of the invention to provide a main power converter which implements dimming down to a first brightness level (i.e. a first depth of dimming) and to enable dimming to a lower brightness level (a second, deeper, dimming depth of dimming), by diverting energy from the LED load, and returning it to an input, using a power commutation stage. Thus, deep dimming is enabled with a simple architecture and the power efficiency is high since the diverted power is re-used instead of dissipated. Preferably, the main power converter is maintained above its minimum output for stable operation.

According to examples in accordance with an aspect of the invention, there is provided a LED driving arrangement comprising:
  an input;
  an output of the LED driving arrangement adapted to connect a LED unit;
  a main converter stage adapted to convert power at the input and to output a converter current to the LED unit at an output of the main converter stage;
  a power commutation stage coupled to the output of the main converter stage;
  a controller adapted to implement an energy divert mode of operation when receiving a signal to set the current to the LED unit at a set current, during which mode the controller is adapted to:
    operate the main converter stage to output the converter current at a current larger than the set current; and
    meanwhile activate the power commutation stage to divert an energy away from the converter current larger than the set current, return the diverted energy to the input of the main converter stage, and allow a remaining current to the LED unit through the output of the LED driving arrangement, wherein the controller is adapted to divert the energy at an amount corresponding to a current difference between the converter current of the main converter stage larger than the set current and the set current, thereby the remaining current to the LED unit equaling to the set current.

This driving arrangement is able to reduce the current delivered to the LED unit to a set current which is below a threshold current, for example for implementing deep dimming, by diverting current from the LED unit and returning the energy to the input rather than delivering it to the LED unit. In this way, a dimming function is implemented by the power commutation stage. This means the dimming level needed to be reached by the main converter stage can be relaxed (i.e. less deep dimming) by maintaining its output current above the threshold current. This reduces the requirements on the main converter stage in while enabling the overall driving arrangement to implement a desired overall dimming level. Since the output current is diverted, the overall achieved dimming level (corresponding to the set current) is for example below 1% (of a nominal LED unit current) for example as low as 0.1%. And since the diverter current/energy is returned to the main converter stage, the deep dimming function is enabled with improved efficiency compared to existing solutions.

The invention may use existing hardware. The main converter stage may comprise a resonant converter. This is a known type of converter for use as the main converter stage in a LED lighting driver. For example, a driver architecture is known (the Signify Xitanium driver) with a half-bridge (LLC/LCC) topology in the main converter stage, and a power commutation stage based on a flyback topology. The invention can make use of this flyback topology further for an auxiliary power supply (discussed below).

In an alternative embodiment, the main converter stage may for example comprise an isolated converter such as a flyback converter or a non-isolated converter such as a boost converter.

In one embodiment, the power commutation stage is adapted to be electrically in parallel with the LED unit. Alternatively, the power commutation stage is adapted to be magnetically coupled to the main converter stage.

The controller is for example adapted to implement the energy divert mode for allowing the remaining current to the LED unit when the set current is below a threshold dimming current, wherein the main converter stage would operate sub-normally if the main converter stage were adapted to directly output the set current below the threshold dimming current.

The threshold dimming level is then a level which can be achieved with desired performance by the main converter stage, such as desired efficiency, stability, power factor correction level, total harmonic distortion level etc. (i.e. any desired or rated parameter). For dimming levels below this threshold level (i.e. even more deep dimming), the power commutation stage is used.

The controller may be adapted to implement a normal dimming mode different from the energy divert mode, when receiving a signal to set the current to the LED unit to the set current above the threshold dimming current.

The main converter stage would operate normally if the main converter stage is adapted to directly output the set current above the threshold dimming level. The normal dimming mode may be implemented by the main converter stage without needing use of the power commutation stage. The controller is thus adapted, during the normal dimming mode, to operate the main converter stage to directly output the set current to the LED unit, and deactivate the power commutation stage to prevent energy being diverted from the converter current. In this way, the power commutation stage does not detract from the normal operation of the main converter stage when it is operating in its intended operating range, and the power commutation stage plays no part in normal operation. Alternatively, as will be discussed below, the power commutation stage may also work to divert power for an auxiliary power supply, and this can reduce the size or rating of the dedicated auxiliary power supply unit.

The threshold dimming current may comprise a minimum designed dimming current to be normally provided by a control loop and components of the main converter stage. The threshold dimming current is for example in the range 1% to 5% of a nominal current of the main converter stage.

The main converter stage, if controlled to deliver an output below the threshold dimming level, is for example not capable of operating at a desired efficiency or stability level (for example), whereas above the threshold dimming level operation is enabled at or above the desired efficiency or stability level.

The power commutation stage may further comprise a winding to provide an auxiliary power supply signal, from a part of the diverted energy, for a non-light-emitting component, and the power commutation stage returns the remaining part of the diverted energy to the input.

When the LED unit is on, this use of the diverted energy contributes to the powering of the non-light-emitting components (such as a control IC). This energy thus contributes to the peak energy demand of the non-light-emitting components.

The arrangement preferably further comprises an auxiliary power supply circuit (additional to the auxiliary power supply signal mentioned above) for providing an alternate auxiliary power to be used by the non-light-emitting component. This can have reduced size as a result of the use of part of the diverted energy to generate another auxiliary power supply signal. Thus, a separate auxiliary power supply for standby power supply can be made smaller (because the control IC requires much less energy when the LED unit is off, so the separate auxiliary power supply can be designed with a small rated power).

The auxiliary power supply circuit is for example connected to either one of:
the input; and
a power component of the main converter stage.

The above are two already known implementation of the auxiliary power supply circuit, such as VCC supply. This connection provides a supply for the auxiliary power supply circuit. The winding used to generate an auxiliary power supply signal provides an alternate auxiliary power supply.

The power commutation stage for example comprises a flyback converter with a primary flyback winding electrically connected in parallel with the output of the main converter stage and adapted to connect in parallel with the LED unit, and a secondary flyback winding magnetically coupled to the primary flyback winding and electrically connected to the input.

This flyback converter is a known arrangement for implementing an auxiliary power supply. Besides the winding (one secondary winding to provide auxiliary power supply), an additional winding (the secondary flyback winding) is added which couples to the input to return energy to the input.

The secondary flyback winding is for example connected to the input through a buffer circuit. The buffer circuit may be a diode or a diode-capacitor circuit.

The power commutation stage may comprise a switch in series with the primary flyback winding, wherein the controller is adapted to activate and deactivate the power commutation stage by controlling the switch. Also, the high frequency flyback commutation is done by this switch.

The switch thus opens or closes a diversion current path for the converter current from the main converter stage.

The invention also provides a lighting circuit comprising:
the driving arrangement as defined above; and
the LED unit.

The invention also provides a driving method for driving a LED unit, comprising:
converting power at an input using a main converter stage thereby to output a converter current to a LED unit at an output of the main converter stage;
implementing an energy divert mode of operation when receiving a signal to set the current to the LED unit at a set current below a threshold dimming current, wherein the main converter stage would operate sub-normally if the main converter stage were adapted to directly output the set current below the threshold dimming current, wherein the energy divert mode of operation comprises:
operate the main converter stage to output a converter current at a current larger than the set current; and
activate a power commutation stage, which is coupled to the output of the main converter stage and in parallel with the LED unit, to divert energy from the converter current and return the diverted energy to the input of the main converter stage, meanwhile delivering the remaining current to the LED unit, wherein diverting the energy at an amount corresponding to a current difference between the converter current of the main converter larger than the set current and the set current, thereby the remaining current to the LED unit equaling to the set current.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
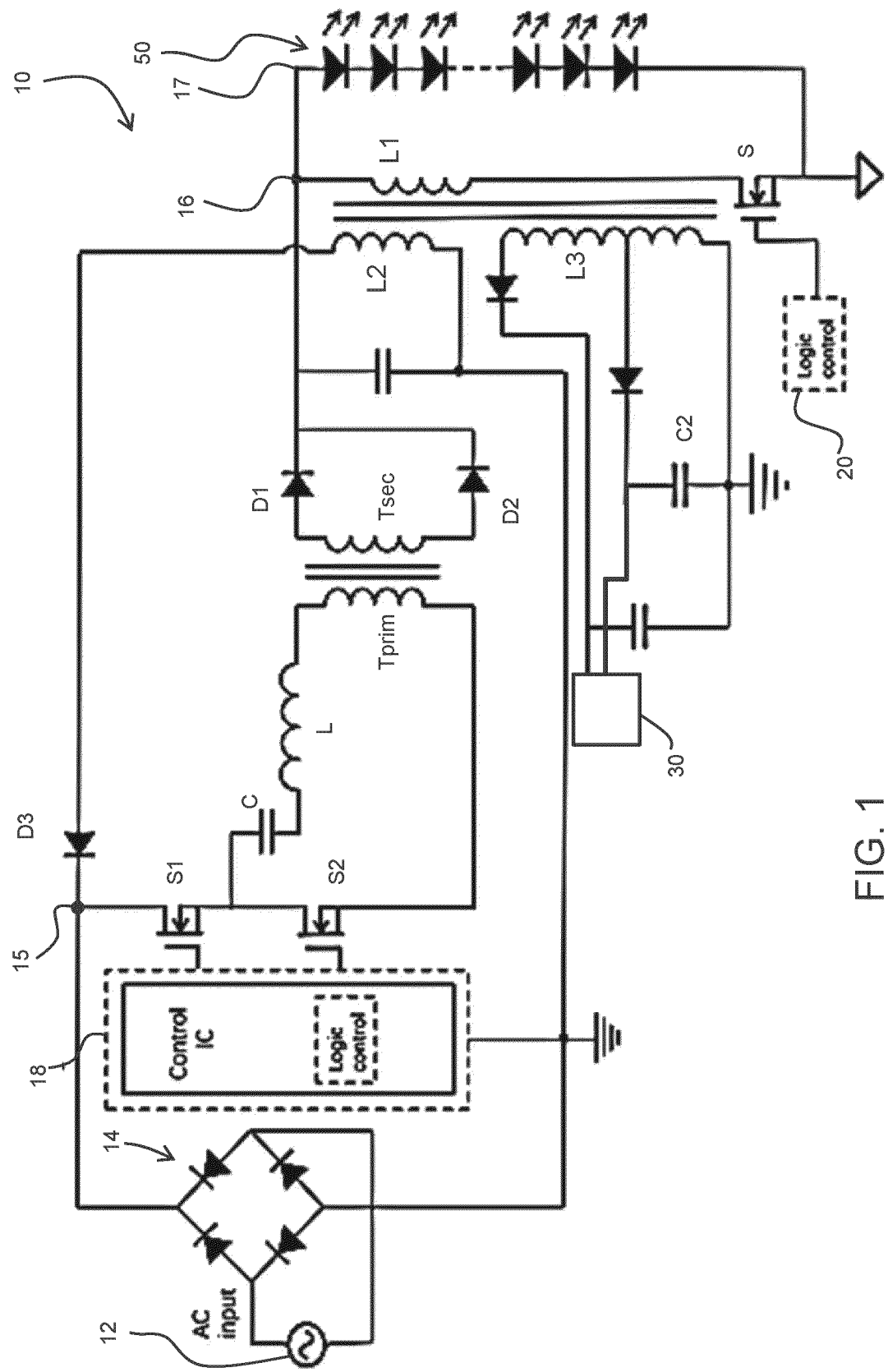
FIG. 1 shows a first example of a LED driving arrangement connected to a LED unit.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED driving arrangement which has a main converter stage, and a power commutation stage in parallel with an LED unit. An energy divert mode of operation is used during which a set current is provided to the LED unit, and the main converter stage is used to deliver a current larger than the set current. The power commutation stage is used to divert energy from the LED unit and return the diverted energy to an input to the main converter. The remaining set current is delivered to the LED unit. This enables deeper dimming than the dimming level applied to the main converter stage, keeping the main converter stage still in a comfort operation zone and increasing the efficiency of energy diversion without dissipating that energy.

FIG. 1 shows a first example of a LED driving arrangement 10 connected to a LED unit 50. Together, they form a lighting circuit, such as part of a luminaire. The driving arrangement has an input 12 which in the example shown is a mains ac input. The input is rectified by a bridge rectifier 14 and supplied as the input 15 to a main converter stage.

The main converter stage comprises a switch mode power converter. The example shown comprises a half bridge formed by switches S1 and S2, and an LLC resonant tank connected to the node between the switches. LLC is a well known technology so the description will not give unnecessary further explanation. The output of the converter is formed by transformer with primary side winding Tprim and secondary side winding Tsec.

The switches S1, S2 are controlled by a control circuit 18.

The LED unit 50 is connected to the secondary side of the transformer through rectifier diodes D1, D2.

The main converter stage is adapted to convert power at the input 12 and to output a converter current to the LED unit at an output 16 of the main converter stage. Other types of resonant converter may be used like an LCC converter. As an alternative to the resonant converter, the main converter stage may be an isolated converter such as a flyback converter or a non-isolated converter such as a boost converter.

A power commutation stage is coupled to the output 16. In the embodiment, it is electrically in parallel with the LED unit 50 so it functions as an electrical energy diversion and returning system. In an alternative embodiment, the power commutation stage could be magnetically coupled to the secondary winding Tsec to form a magnetic energy diversion system. In the below description the electrical energy diversion is taken as example to describe the invention. Those skilled in the art will understand that magnetic energy diversion and returning is similar in concept and implementation, and this alternative will not therefore be described in further detail.

The power commutation stage comprises a flyback converter with a primary flyback winding L1 electrically connected in parallel with the LED unit 50, and a secondary flyback winding L2 magnetically coupled to the primary flyback winding and electrically connected to the input 15 of the main converter stage.

The coupling to the input 15 is through diode D3 back to the half bridge S1, S2. The diode D3 functions as a blocking circuit. There may be a buffer capacitor to buffer the returned energy. Thus, when a changing current is generated in the inductor L1, there is an induced magnetic field and induced current in L2, and by this mechanism energy delivered to the output is returned to the input 15 of the main converter stage.

In a preferred embodiment, besides the energy returning function, the flyback converter is a known arrangement for implementing an auxiliary power supply. Thus, the diverted energy may be used for an auxiliary supply of a non-lighting component such as a MCU/IC. The additional winding L3 is for this purpose (discussed below).

The power commutation stage has a switch S in series with the primary flyback winding L1.

A controller 20 activates and deactivates the power commutation stage by controlling the switch S. The switch S opens or closes a bypass current path for the converter current from the main converter stage. In this way, the controller 20 implements an energy divert mode of operation.

The divert mode is used when a set current with which the LED unit is to be driven is too low for the main converter stage to achieve, with desired efficiency and/or accuracy and/or stability and/of acceptable PFC/THD, etc. During this divert mode, the converter current of the main converter stage is maintained at a current larger than the set current, so that it can be delivered with desired accuracy and efficiency etc. The power commutation stage is however activated to divert energy from the converter current and return the diverted energy to the input 15. The result is that the desired set current is still delivered to the LED unit 50.

The current delivered to the LED unit is thus reduced to the set current, which is below a threshold current. The threshold current corresponds to a threshold dimming level. This is a dimming level which can be achieved with desired efficiency by the main converter stage. For dimming levels below this threshold level (i.e. even more deep dimming), the power commutation stage is used.

Thus, deep dimming is implemented by diverting current from the LED unit using the power commutation stage. This reduces the requirements on the main converter stage for the overall driving arrangement to be able to implement a desired overall dimming level. The overall achieved dimming level (corresponding to the set current) is for example below 1% (of a nominal LED unit current) for example as low as 0.1%.

For brightness levels above this threshold level, a normal dimming mode is used, which may be implemented by the main converter stage without needing use of the power commutation stage. Thus, during the normal dimming mode, the main converter stage is used to directly output the converter current as the set current to the LED unit and the power commutation stage is deactivated (to prevent energy being diverted from the converter current).

The invention may use existing hardware. For example, a driver architecture is known (the Signify Xitanium driver) with a half-bridge (LLC or LCC) topology in the main circuit as shown.

The auxiliary power supply using the flyback topology is shown as inductor L3. As shown, the inductor L3 has two taps for generating two different auxiliary supply voltages, stored on respective capacitors C1, C2. These may for example be two or more of 3V, 5V, 12V and 24V.

The auxiliary supply using coil L3 is only operational when the main converter is delivering an output, and thus not during standby. The winding L3 provides an auxiliary power supply signal, from a part of the diverted energy. Thus, the diverted energy is based on a current through coil L3, and this is used to induce currents in both L2 and L3, each of which thus form part of the diverted energy. The part of the diverted energy induced in coil L3 is for example used for powering a non-light-emitting component. This may for example be the controller 18 or other control circuits or sensors.

In both above dimming mode and normal mode, the main converter stage may even output more energy and allow the auxiliary supply using coil L3 to divert energy for auxiliary supply use.

There is also a separate auxiliary power supply circuit 30 which functions during standby (when no energy is delivered to the LED unit and hence no induced signal is generated by the flyback converter).

Traditionally this dedicated auxiliary power supply circuit 30 needs to cover a large range of output power. In standby, the required output power is low, but when the LED unit is on, the control circuit 18 needs a larger amount of power so the auxiliary supply needs to output a larger power. The rated power of the auxiliary power supply is therefore sufficient to meet the highest demand, but this capacity is redundant much of the time.

In this invention, since the inductor L3 can deliver auxiliary power when the LED is on (even if the LED is not deeply dimmed) so the coupling between L1 and L3 can be used to divert energy for peak auxiliary supply use. The main converter stage can be set to output a larger current than the desired LED current so that part can be diverted to provide energy transfer from L1 to L3.

In this way, the auxiliary power supply circuit 30 does not need to be designed with such a high power rating because it only needs to provide a small output power in the standby mode or supplementary to the coil L3. Thus, the auxiliary power supply circuit 30 can be smaller than in existing designs.

The auxiliary power supply circuit 30 is a dedicated auxiliary power supply. It may be connected directly to the bus after the rectifier, or it may induce power from the inductor of the switch mode converter or from the transformer Tprim, Tsec. It may for example comprise a buck converter and a linear regulator. Those skilled in the art understand that a normal auxiliary power supply circuit 30 is well known so this description does not give further details.

In light output mode, when there is diverted energy, the energy stored in inductor L3 may or may not be enough for the non lighting load (e.g. controller 18). When enough, the original auxiliary power supply circuit is not needed so the rated power can be lower. When not enough, the original auxiliary power supply circuit 30 may be used to provides the rest.

In a lights-off mode, the original auxiliary power supply circuit 30 works alone.

In an extreme condition during the lights-off mode, if the auxiliary power supply circuit 30 is still not sufficient, the half-bridge S1, S2 can start and the coupling between inductors L1 and L3 can be used to divert all output power to the non-lighting load.

Thus, the dedicated auxiliary power supply circuit 30 and the power commutation circuit have their own operations and functions. When in a deep dimming phase, they cooperate to implement a desired deep dimming level so that the LED color temperature regulation can be more precise, and hence RGBW color mixing can be used to enable a greater range of desired colors.

The invention makes additional use of existing circuits, in particular reusing an auxiliary power supply by providing interaction with the half-bridge circuits. The Flyback topology operates with two functions at different levels of dimming.

Figure 2:
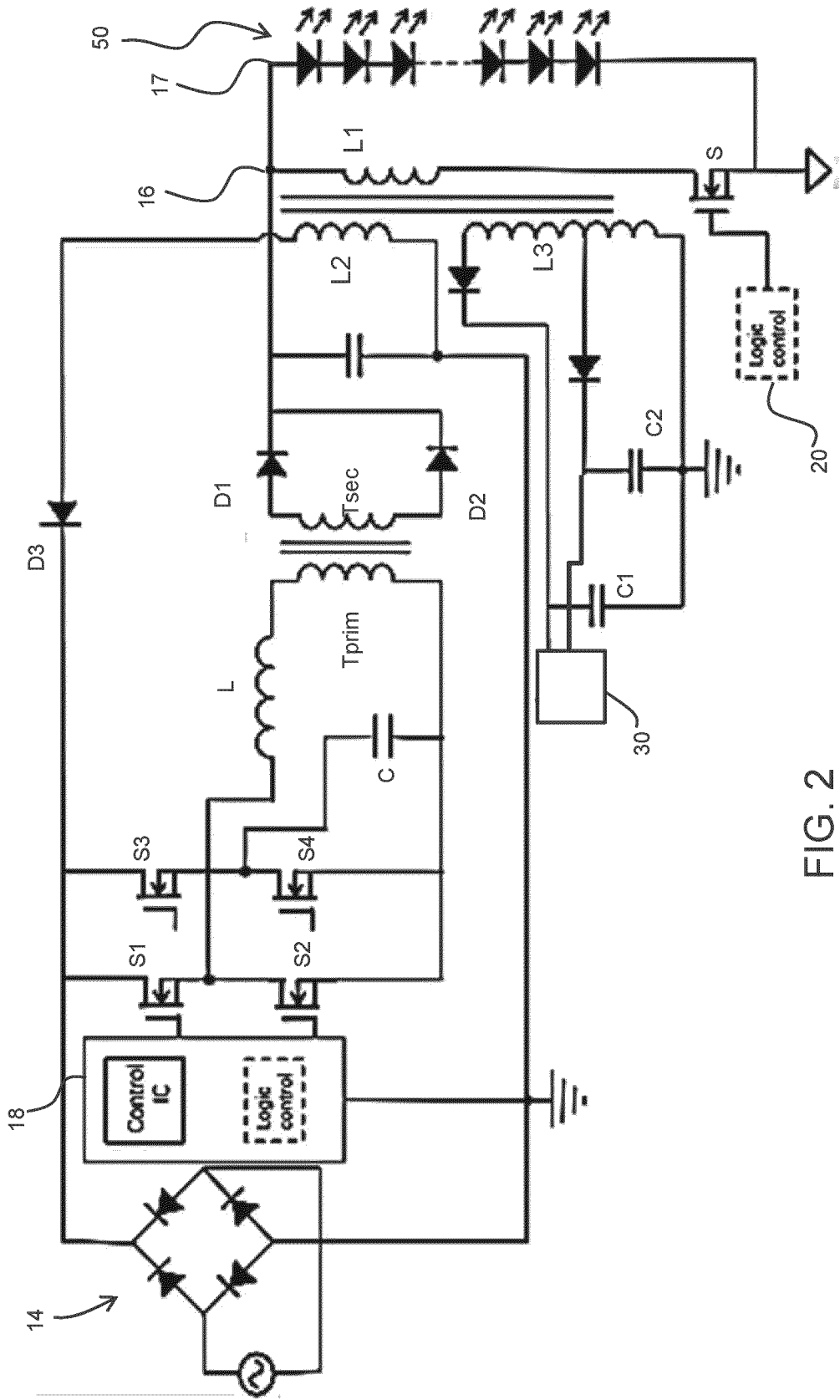
FIG. 2 shows a second example of a LED driving arrangement.

FIG. 2 shows a second example of a LED driving arrangement. It differs from FIG. 1 in that a full bridge topology S1 to S4 is used by the main converter.

Figure 3:
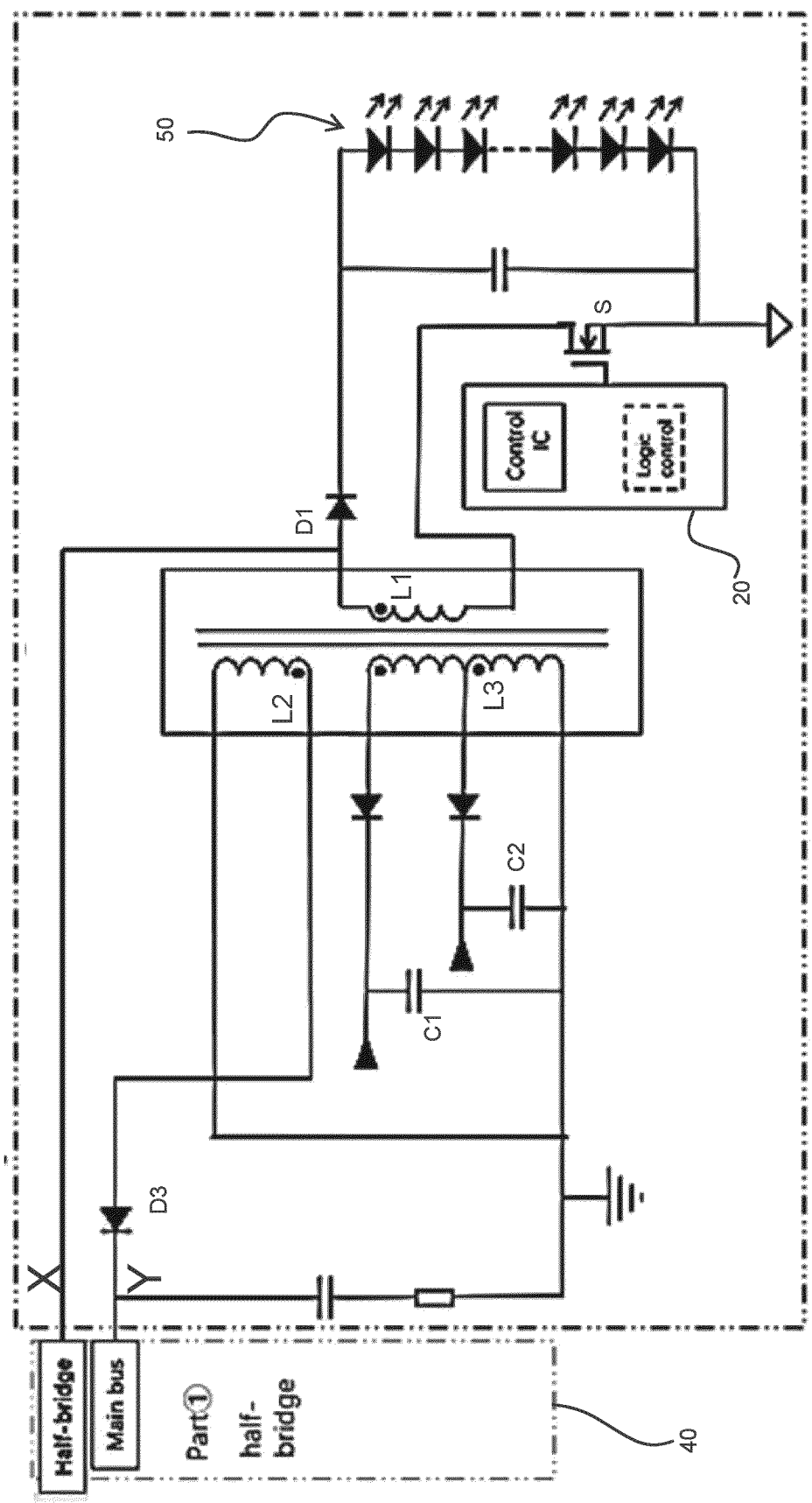
FIG. 3 shows a third example of a LED driving arrangement.

FIG. 3 shows a third example of a LED driving arrangement.

The main converter is represented simply by block 40. In this example, the diode D3 couples back to the main bus, i.e. the output of the rectifier. The primary flyback winding L1 has a connection back to the half bridge, i.e. the output of the LLC converter stage. This is simply an alternative topology.

The invention also provides a driving method for driving a LED unit, comprising converting power at an input using a main converter stage thereby to output a converter current to a LED unit at an output of the main converter stage. An energy divert mode of operation is implemented when receiving a signal to set the current to the LED unit at a set current below a threshold dimming current, wherein the main converter stage would operate sub-normally if the main converter stage were adapted to directly output the set current below the threshold dimming current. The energy divert mode of operation comprises:

maintaining the converter current of the main converter stage at a current larger than the set current; and
activating a power commutation stage, which is coupled to the output and in parallel with the LED unit, to divert energy from the converter current and return the diverted energy to the input, meanwhile delivering the remaining current to the LED unit, wherein diverting the energy at an amount corresponding to a current difference between the converter current of the main converter stage larger than the set current and the set current, thereby the remaining current to the LED unit equaling to the set current.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A LED driving arrangement comprising:
   an input;
   an output of the LED driving arrangement adapted to connect a LED unit;
   a main converter stage adapted to convert power at the input and to output a converter current to the LED unit at an output of the main converter stage;
   a power commutation stage coupled to the output of the main converter stage and coupled to the input;
   a controller adapted to implement an energy divert mode of operation, when receiving a signal to set the current to the LED unit at a set current, during which mode the controller is configured to:
      operate the main converter stage to output the converter current at a current larger than the set current; and
      meanwhile activate the power commutation stage to divert an electrical energy at an amount corresponding to a current difference between the converter current of the main converter stage, being larger than the set current, and the set current, return the diverted electrical energy to the input and to the main converter stage, and allow a remaining current to the LED unit through the output of the LED driving arrangement, thereby the remaining current to the LED unit equaling to the set current.

2. The driving arrangement as claimed in claim 1, wherein an input of the power commutation stage is coupled to the output of the LED driving arrangement, and an output of the power commutation stage is coupled to the input of the LED driving arrangement, the power commutation stage is adapted to be electrically in parallel with the LED unit, and the controller is configured to:
   implement the energy divert mode for allowing the remaining current to the LED unit, when the set current is below a threshold dimming current,
   wherein the main converter stage would operate subnormally if the main converter stage were adapted to directly output the set current below the threshold dimming current.

3. The driving arrangement as claimed in claim 2, wherein the controller is configured to implement a normal dimming mode different from the energy divert mode, when receiving a signal to set the current to the LED unit to the set current above the threshold dimming current.

4. The driving arrangement as claimed in claim 3, wherein the main converter stage would operate normally if the main converter stage is adapted to directly output the set current above the threshold dimming level, and wherein the controller is configured, during the normal dimming mode, to:
   operate the main converter stage to directly output the converter current at the set current to the LED unit; and
   deactivate the power commutation stage to prevent the electrical energy being diverted from the converter current.

5. The driving arrangement as claimed in claim 2, wherein the threshold dimming current comprises a minimum designed dimming current to be normally provided by a control loop and components of the main converter stage.

6. The driving arrangement as claimed in claim 2, wherein the threshold dimming current is in the range 1% to 5% of a nominal current of the main converter stage.

7. The driving arrangement as claimed in claim 1, wherein the power commutation stage further comprises a winding to provide an auxiliary power supply signal, from a part of the diverted electrical energy, for a non-light-emitting component, and the power commutation stage returns a remaining part of the diverted electrical energy to the input.

8. The driving arrangement as claimed in claim 7, further comprising an auxiliary power supply circuit for providing an alternate auxiliary power supply to be used by the non-light-emitting component.

9. The driving arrangement as claimed in claim 8, wherein the auxiliary power supply circuit is connected to either one of:
   the input; and
   a power component of the main converter stage.

10. The driving arrangement as claimed in claim 1, wherein the main converter stage comprises a resonant converter.

11. The driving arrangement as claimed in claim 1, wherein the power commutation stage comprises a flyback converter with a primary flyback winding electrically connected in parallel with the output of the main converter stage and adapted to connect in parallel with the LED unit, and a secondary flyback winding magnetically coupled to the primary flyback winding and electrically connected to the input.

12. The driving arrangement as claimed in claim 11, wherein the secondary flyback winding is connected to the input and to the main converter stage through a buffer circuit.

13. The driving arrangement as claimed in claim 11, wherein the power commutation stage comprises a switch in series with the primary flyback winding, wherein the controller is configured to activate and deactivate the power commutation stage by controlling the switch.

14. A lighting circuit comprising:
   the driving arrangement as claimed in claim 1; and
   the LED unit.

15. A driving method for driving a LED unit, the method comprising:
   converting power at an input using a main converter stage thereby to output a converter current to a LED unit at an output of the main converter stage;
   implementing an energy divert mode of operation when receiving a signal to set the current to the LED unit at a set current below a threshold dimming current, wherein the main converter stage would operate subnormally if the main converter stage were adapted to directly output the set current below the threshold dimming current, wherein the energy divert mode of operation comprises:
      operate the main converter stage to output a converter current at a current larger than the set current; and activate a power commutation stage, which is coupled to the output of the main converter stage and in parallel with the LED unit and coupled to the input of the main converter stage, to divert an electrical energy at an amount corresponding to a current difference between the converter current of the main converter stage, being larger than the set current, and the set current, return the diverted electrical energy to the input of the main converter stage, meanwhile delivering a remaining current to the LED unit, thereby the remaining current to the LED unit equaling to the set current.

\* \* \* \* \*